United States Patent
Karp et al.

(10) Patent No.: US 7,366,956 B2
(45) Date of Patent: Apr. 29, 2008

(54) DETECTING DATA RACES IN MULTITHREADED COMPUTER PROGRAMS

(75) Inventors: Alan H. Karp, Palo Alto, CA (US); Jean-Francois C. Collard, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 406 days.

(21) Appl. No.: 10/870,722

(22) Filed: Jun. 16, 2004

(65) Prior Publication Data

US 2005/0283781 A1    Dec. 22, 2005

(51) Int. Cl.
G06F 11/00    (2006.01)

(52) U.S. Cl. .................... 714/38; 717/124; 711/150
(58) Field of Classification Search .................. 714/38
See application file for complete search history.

(56) References Cited

U.S. PATENT DOCUMENTS

| | | |
|---|---|---|
| 5,224,100 A | 6/1993 | Lee et al. |
| 5,822,588 A | 10/1998 | Sterling et al. |
| 6,009,269 A | 12/1999 | Burrows et al. |
| 6,094,713 A | 7/2000 | Khadder et al. |
| 6,286,130 B1 | 9/2001 | Poulsen et al. |
| 6,343,371 B1 | 1/2002 | Flanagan et al. |
| 6,378,124 B1 | 4/2002 | Bates et al. |
| 6,405,326 B1 | 6/2002 | Azagury et al. |
| 6,457,100 B1 | 9/2002 | Ignatowski et al. |
| 6,578,094 B1 | 6/2003 | Moudgill |
| 6,587,967 B1 | 7/2003 | Bates et al. |
| 6,631,460 B1 | 10/2003 | Morris et al. |
| 6,636,949 B2 | 10/2003 | Barroso et al. |
| 6,681,317 B1 | 1/2004 | Mathews |
| 6,728,867 B1 | 4/2004 | Kling |
| 6,851,075 B2 * | 2/2005 | Ur et al. .................... 714/36 |
| 2002/0129306 A1 * | 9/2002 | Flanagan et al. ........... 714/100 |
| 2003/0131283 A1 | 7/2003 | Ur et al. |
| 2003/0135722 A1 | 7/2003 | Johnson |
| 2003/0236951 A1 * | 12/2003 | Choi et al. .................... 711/150 |
| 2005/0091646 A1 * | 4/2005 | Chilimbi et al. ............ 717/130 |

OTHER PUBLICATIONS

Christiaens, M., Dynamic techniques for the optimization of data race detection, In: Program Acceleration through Application and Architecture driven Code Transformations: Symposium Proceedings, pp. 73-75, Sep. 2002.

* cited by examiner

Primary Examiner—Yolanda L Wilson

(57) ABSTRACT

In one aspect, a value of a variable shared by multiple threads for executing the program code is stored in a thread-local variable. A data race condition is detected based on a comparison of values of the shared variable and the thread-local variable. Detection of the data race condition is reported. In another aspect, a machine-readable instruction to store in a thread-local variable a value of a variable shared by multiple threads for executing the program code is generated. A machine-readable instruction to detect a data race condition based on a comparison of values of the shared variable and the thread-local variable is generated. The machine-readable instructions are stored in a machine-readable medium.

26 Claims, 4 Drawing Sheets

DETECTING DATA RACES IN MULTITHREADED COMPUTER PROGRAMS

BACKGROUND

Many modern operating systems support the use of multithreaded programs, which consist of one or more threads of control that share a common address space and program resources. In multithreaded programs a shared addressable resource, such as a global variable, can be accessed by multiple threads. As a result, the threads of a multithreaded program should be synchronized in order to permit the threads to read from or write to the shared addressable resources without causing a data race. A data race occurs when two or more threads concurrently access a shared variable (memory location) without synchronization and at least one of these accesses is for storing to the shard variable. When a data race condition exists, the value of the shared variable at a particular time in the execution of a thread depends on the order in which the threads accessing the shared variable are executed. Detecting data race conditions is difficult because they are non-deterministic and they may occur as a result of unrelated sections of code accessing the shared variable.

Race conditions may be avoided by incorporating various mechanisms for ensuring that each thread has mutually exclusive access to a shared resource. In one approach, a shared resource is protected by requiring threads to obtain a designated mutually exclusive lock before the shared resource can be modified. Threads without the lock must wait until the current thread releases the lock. Race-free program code may be guaranteed by diligent use of such mutual exclusion locking mechanisms since at each instance only one thread can hold the lock for a particular shared variable.

Various program analysis tools (e.g., debuggers) have been proposed for detecting race conditions. Some program analysis tools are configured to detect data races dynamically during execution of the program code. Dynamic data race detection tools use tracing mechanisms to determine whether a data race occurred during a particular execution of a program. In general, dynamic data race detection methods impose a high overhead on program execution. Other program analysis tools are configured to detect data race conditions statically by, for example, tracing the execution of every path through the program code. Static race detection tools perform a compile-time analysis of a program's source code. In general, static race detection methods tend to generate a significant number of false alarms, making the detection of actual race conditions difficult for programmers.

To summarize, prior approaches for detecting data races impose large performance penalties or are prone to produce erroneous results. What is needed are systems and methods for detecting data race conditions in multithreaded programs in ways that do not impose substantial processing overhead and are significantly less prone to error.

SUMMARY

In one aspect, the invention features a machine-implemented method of processing program code in accordance with which a value of a variable shared by multiple threads for executing the program code is stored in a thread-local variable. A data race condition is detected based on a comparison of values of the shared variable and the thread-local variable. Detection of the data race condition is reported.

In another aspect, the invention features a machine-implemented method of processing program code in accordance with which a machine-readable instruction to store in a thread-local variable a value of a variable shared by multiple threads for executing the program code is generated. A machine-readable instruction to detect a data race condition based on a comparison of values of the shared variable and the thread-local variable is generated. The machine-readable instructions are stored in a machine-readable medium.

The invention also features machines and machine-readable media storing machine-readable instructions for implementing each the inventive program code processing methods described above.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The data race detection embodiments described in detail below provide a dynamic solution for detecting data races in shared memory, parallel programs that may be implemented in software in way that does not impose substantial processing overhead or other significant burden on the development tool chain.

These data race detection embodiments avoid the performance penalties associated with prior dynamic, lock-based race detection schemes and avoid the significant number of false alarms associated with prior static data race detection approaches.

Figure 1:
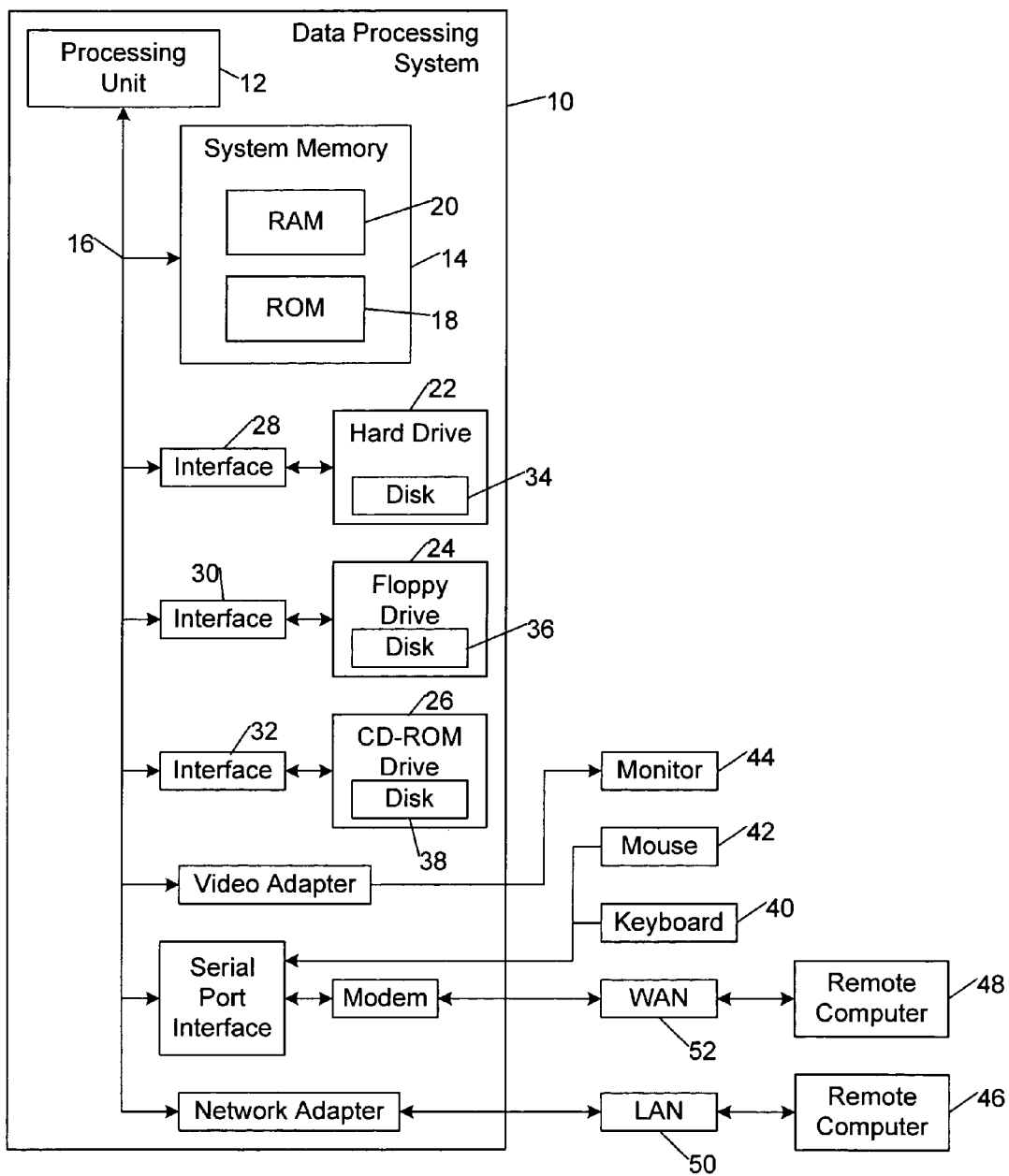
FIG. 1 is a block diagram of an embodiment of a data processing system.

FIG. 1 shows a data processing system 10 that may embody and implement one or more of the data race detection embodiments described herein. The data processing system 10 includes a processing unit 12, a system memory 14, and a system bus 16 that couples processing unit 12 to the various components of data processing system 10. Processing unit 12 may include one or more processors, each of which may be in the form of any one of various commercially available processors that provide some form of data speculation functionality. System memory 14 includes a read only memory (ROM) 18 that stores a basic input/output system (BIOS) containing start-up routines for data processing system 10, and a random access memory (RAM) 20. System bus 16 may be a memory bus, a peripheral bus or a local bus, and may be compatible with any of a variety of bus protocols, including PCI, VESA, Microchannel, ISA, and EISA. Data processing system 10 also includes a hard drive 22, a floppy drive 24, and CD ROM drive 26 that are connected to system bus 16 by respective interfaces 28, 30, 32. Hard drive 22, floppy drive 24, and CD ROM drive 26 contain respective computer-readable media disks 34, 36, 38 that provide non-volatile or persistent storage for data, data structures and computer-executable instructions. Other computer-readable storage devices (e.g., magnetic tape drives, flash memory devices, and digital video disks) also may be used with data processing system 10. A user may interact (e.g., enter commands or data) with data processing system 10 using a keyboard 40 and a mouse 42. Other input devices (e.g., a microphone, joystick, or touch pad) also may be provided. Information may be displayed to the user on a monitor 44. Data processing system 10 also may include peripheral output devices, such as speakers and a printer. Data processing system 10 may be connected to remote computers 46, 48, which may be workstations, server computers, routers, peer devices or other common network nodes. Remote computer 46 may be connected to data processing system 10 over a local area network (LAN) 50, and remote computer 48 may be networked over a wide area network (WAN) 52 (e.g., the internet).

Figure 2:
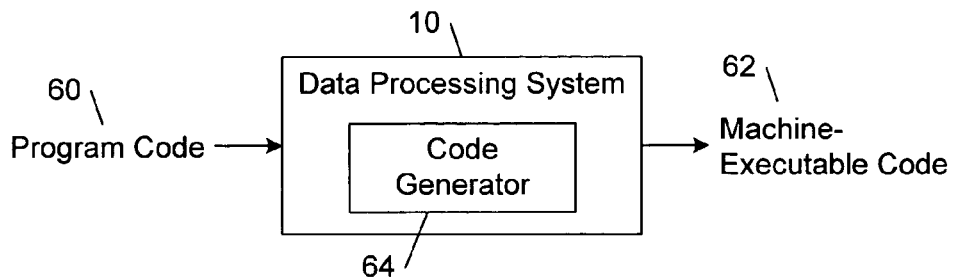
FIG. 2 shows a data pipeline that includes program code that is being processed by the data processing system embodiment of FIG. 1 into machine-executable code.

Generating Machine-Executable Code Containing Embedded Data Race Detection Instructions FIG. 2 shows a data pipeline by which data processing system 10 processes program code 60 into machine-executable code 62 that incorporates machine-readable instructions for detecting data race conditions. In particular, the processing system 10 executes a code generator 64 that generates machine-readable instructions corresponding to the program code 60, as well as data race detection instructions, and stores the machine-readable instructions as machine-executable code 62 on a machine-readable medium (e.g., one or more of RAM 20 and disks 34-38 shown in FIG. 1). Program code 60 may correspond to a complete program, a segment of a computer program, or a stream of program instructions. In general, the code generator 64 is not limited to any particular hardware or software configuration, but rather it may be implemented in any computing or processing environment, including in digital electronic circuitry or in computer hardware, firmware, device driver, or software. In some implementations, the code generator 64 may be a compiler, a program translation system, or a suitable run-time system that transforms program code 60 into a machine-executable form (e.g., machine language).

Figure 3:
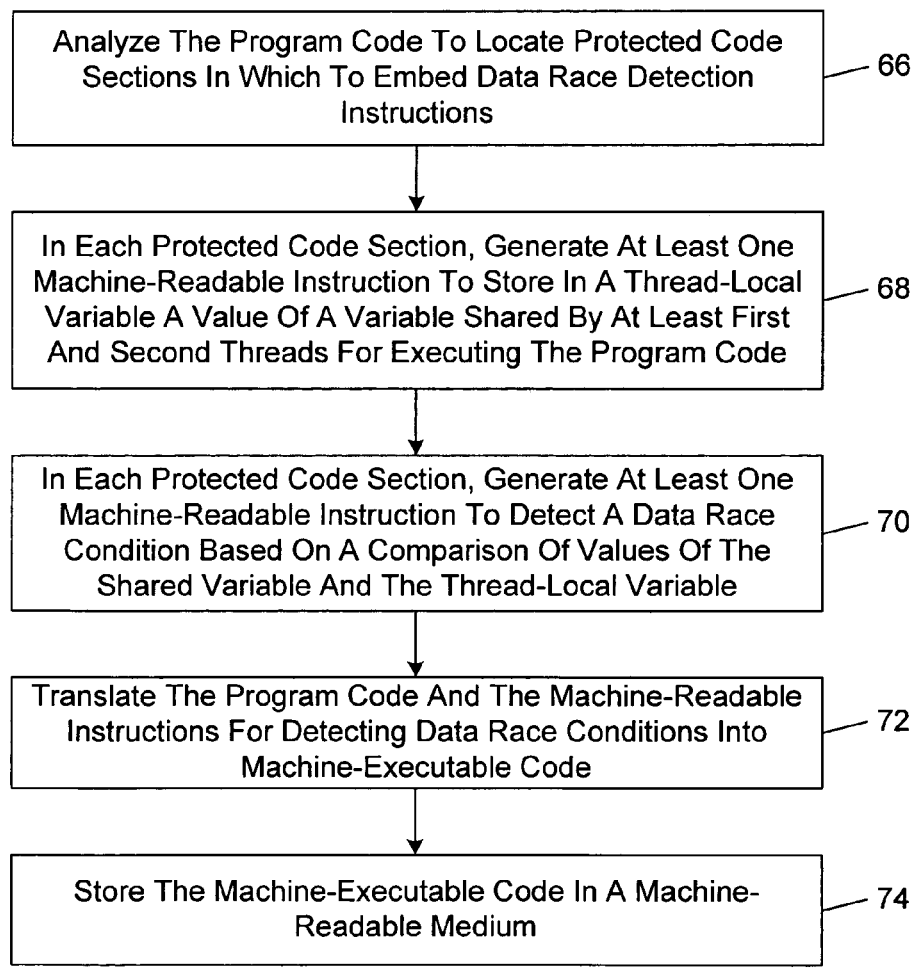
FIG. 3 is a flow diagram of an embodiment of a method of processing program code into machine-executable code that includes machine-readable instructions for detecting data race conditions.

FIG. 3 shows an embodiment of a method by which code generator 64 processes program code 60 into machine-executable code 62. In the course of translating the program code 60, the code generator 64 typically preprocesses the program code 60. During the preprocessing stage, the code generator 64 performs tasks specified by any preprocessor statements (e.g., pragmas or directives, terms which are used interchangeably herein) in the program code 60, such as reading in header files, defining constants, and evaluating expressions. In addition, code generator 64 analyzes the program code 60 to locate protected code sections in which to embed data race detection instructions (block 66). In the embodiments described in detail below, the code generator 64 locates protected code sections based on explicit pragmas (or compiler directives) contained in the program code 60. In other embodiments, the code generator 64 may be configured to locate protected code sections automatically.

In each protected code section, code generator 64 generates at least one machine-readable instruction to store in a thread-local variable a value of a variable that is shared by multiple threads for executing the program code 60 (block 68). In each protected code section, code generator 64 also generates at least one machine-readable instruction to detect a data race condition based on a comparison of values of the shared variable and the thread-local variable (block 70).

After the preprocessing stage, code generator 64 translates the program code 60 and the machine-readable instructions for detecting data race conditions into machine executable code 62 (block 72). In particular, the code generator 64 translates the program code 60, the data race detection instructions, and header files into a machine-readable equivalent assembly language file (or object file). The code generator 64 then begins a linking stage, during which the object file and any associated object library files are combined into a single program object file. In addition, during the linking stage the code generator 64 resolves external references, searches libraries, and performs other processing tasks to produce an object module that is ready for execution. The code generator 64 further processes the resulting object module to produce the machine-executable code 62, which then may be stored in a machine-readable medium (block 74).

Figure 4:
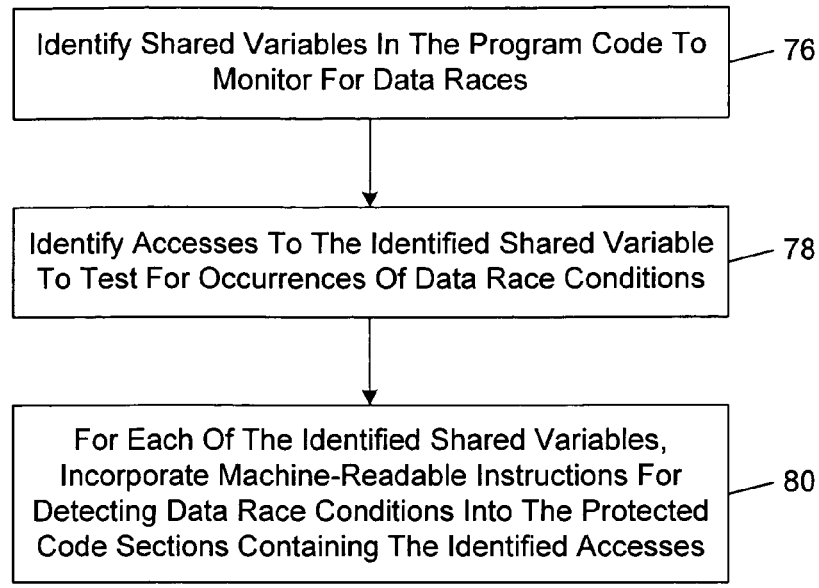
FIG. 4 is a flow diagram of an implementation of the program code processing blocks 66-70 in the embodiment of FIG. 3.

FIG. 4 shows an implementation of the program code processing blocks 66-70 in the embodiment of FIG. 3. In this implementation, the code generator 64 identifies shared variables in the program code 60 to monitor for data races (block 76). The code generator 64 also identifies accesses to the identified shared variable to test for occurrences of data race conditions (block 78). In one exemplary embodiment, code generator 64 also identifies the shared variables and the shared variable accesses corresponding to the protected sections of code based on a compiler pragma, protect, which code generator 64 translates into run-time assertions. The protect pragma applies to the explicit scope that immediately follows the pragma, as explained in detail below.

For each of the identified shared variables, code generator 64 incorporates machine-readable instructions for detecting data race conditions into the protected program code sections containing the identified accesses (block 80). In particular, the code generator 64 inserts a test before each identified read access to a shared object (the terms "shared object" and "shared variable" are used interchangeably herein) and a store operation after each update of the shared object. The store operation records in a thread-local variable the value the thread expects the object to have when next encountered, and the test makes sure the object has the expected value. An error message may be generated when a discrepancy is detected. Multiple threads may protect the same object.

Figure 5:
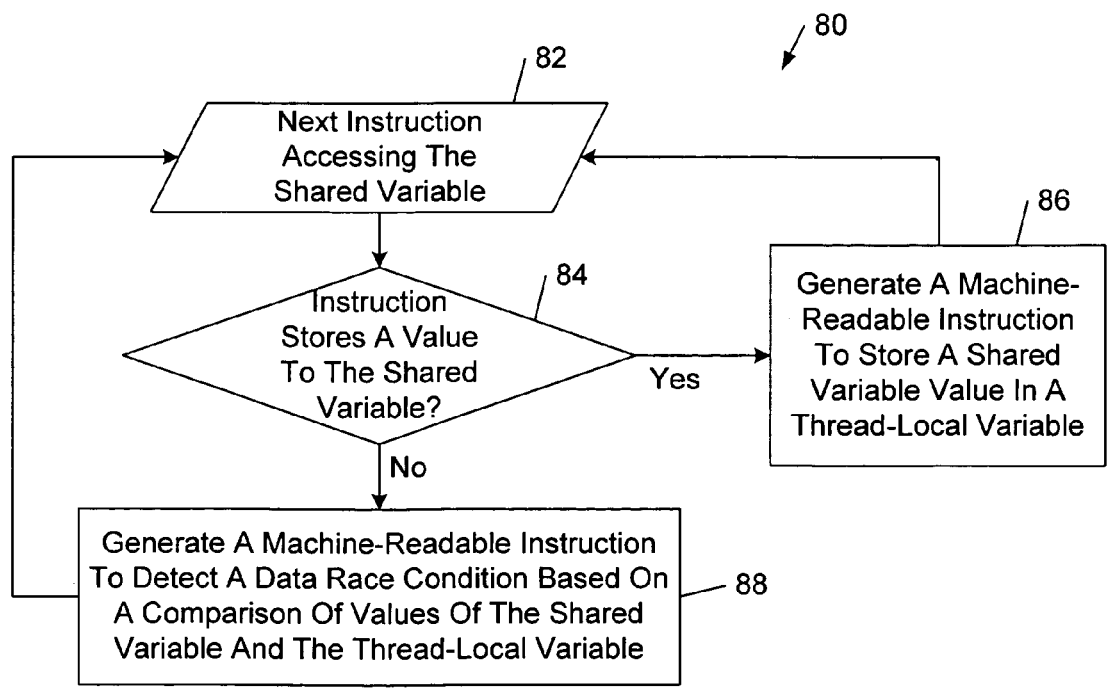
FIG. 5 is a flow diagram of an implementation of the program code processing block 80 shown in FIG. 4.

FIG. 5 shows an implementation of the process of block 80 that is applied to each of the identified accesses to each of the identified shared variables. In accordance with this process, each instruction 82 in a protected section of the program code 60 that accesses the shared variable is analyzed. If the instruction 82 stores a value to the shared variable (block 84), the code generator 64 generates a machine-readable instruction to store the shared variable value in a thread-local variable (block 86). If the instruction 82 does not store a value to the shared variable (block 84), the code generator 64 generates a machine-readable instruction to detect a data race condition based on a comparison of values of the shared variable and the thread-local variable (block 88). The process implementation of FIG. 5 is summarized by the following pseudo-code example, where by convention saved_v is the thread-local variable corresponding to shared variable v (each thread has a copy of saved_v).

For each protected shared variable v, do:
   On entry to protected section of program code 60, insert code recording value of v into saved_v
   For each access b of v in protected section do:
     IF access b is an update of v THEN do
       record new value into saved_v
     OTHERWISE
       insert code comparing v and saved_v
   On exit from protected section, insert code comparing v and saved_v In block 80, the process of incorporating machine-readable instructions for detecting data races into the protected sections of program code 60 is illustrated with reference to the following code example, which corresponds to an excerpt of a thread of the program code 60. On the left is the original program code and, on the right, is the program code after code generator 64 has processed the original program code. According to this embodiment, the protected section is indicated by the user with the help of a pragma. According to another embodiment, protected sections are indicated by programmers by any sort of code annotation. According to another embodiment, protected sections are decided by software, possibly compilers. In this example, suspension points contain no reference to x within the protected region delimited by the protect pragma.

```
1  int a;                        1  int a;
2  int shared x=3;               2  int shared x=3;
3  ...                           3  ...
4  #pragma protect x
4b {                             4b {
                                 4c     int saved__x=x;
5  ...                           5   ...
6      a = x;                    6b     if(x != saved__x)
                                 6c         error( );
                                 6d     a = saved__x;
7  ...                           7   ...
8      x = foo;                  8b     if(x != saved__x)
                                 8c         error( );
                                 8d     tmp = foo;
                                 8e     x=saved__x = tmp;
9  ...                           9   ...
                                 9b     if(x != saved__x)
                                 9c         error( );
10 }                             10 }
```

EXAMPLE 1

On line 6d, the instruction to assign the thread-local variable saved_x to a instead of the shared variable x ensures that the thread uses the expected value of x even if another thread modifies x between lines 6b and 6d. The same technique is used to update the value of x on lines 8b-8e. With respect to this section of code, if two threads increment x, each thread executes three instructions: read x, add 1, and write x. In this example, any interleaving of the six instructions is possible. For example, a first thread may have modified x after a second thread has read x but before the second thread has updated x. In the absence of atomic increments, each thread wants in general to make sure the value of a protected object hasn't change behind its back even when it is about to write into x. The data race test inserted in lines 8b and 8c is used to catch this situation.

Exemplary Implementation of the Protect Pragma

In the example described above, the back-up variable (i.e., saved_x) is declared in the explicit scope. Some implementations require that there are no incoming control-flow edges into the protection scope from outside the scope so that the code that initializes the back-up object may not otherwise be executed. In this way, the initialization code of the back-up variable dominates any use of the variable. In these implementations, there may be outgoing edges, without risk of memory leaks.

In some implementations, the protect directive is restricted to make sure back-up data structures can be statically allocated, as follows:

```
#pragma protect object
{
    // Scope where the pragma applies
}
``` where object is either:
   the name of a scalar, in which case the scalar is protected by all threads; or
   the name of an array, in which case the entire array is protected by all threads, or
   an array element identified by compile-time constants; this array element is protected by all threads, or
   the name of an array followed by two brackets, like:
     #pragma protect p[]. This tells the code generator 64 to protect on each thread but within the following C scope all elements of p that have affinity with the thread. This form of the directive is forbidden if the block factor of p is 0.
   the name of an array followed by two brackets surrounding the name of another array t, like: #pragma protect p[t]. Array t must be of the same dimension as p, and the size of each dimension must be equal. There is therefore a natural one-to-one mapping between elements of both arrays. This pragma instructs the code generator 64 to protect those elements of p whose corresponding elements of t have affinity with the current thread.

Exemplary Program Code 60 to be Processed by Code Generator 64

The code that the code generator 64 generates for each form of the protect directive is explained in the next two sections. This explanation is described in the context of EXAMPLE 2 below, which is written in the Unified Parallel C (UPC) language. UPC is a parallel extension of C that provides a global address space, possibly on top of MPI or GasNET, and can therefore be ported to systems relying on message-passing as well as to machines with physically shared memory. Because UPC is a SPMD language, each thread executes the same UPC code. Data are either private to a thread, or shared, in which case they are distributed across threads in a way specified by the user. Each thread has direct access (i.e., through standard C assignments and references) to its own private local data, to the local portion of shared data, and to remote shared data. Private and shared data can be accessed through pointers, and UPC extends C's pointer arithmetic to pointers to shared data.

Lines 1, 2 and 3 of the code in EXAMPLE 2 declare three shared arrays, p being an array of pointers. Shared objects are global. All three arrays have the same affinities with threads. The elements of t are the same size as that of pointers on the target platform, which in one implementation is "LP64" (i.e., longs and pointers are 64-bit long). Lines 5 and 6 declare locals, including private pointer-to-shared t2. Lines 7 through 11 initialize u, t, and p. Some values get printed on lines 12-14 for the sake of the discussion. Line 15 sets t2 to the address of the element of t that is local to (has affinity with) the current thread. Line 16 increments t2 and therefore makes t2 point to a remote (non-local) element of t. Line 18 assigns 0 to presumably the element of t pointed to by t2, but, its execution on thread THREADS-1 in fact corrupts p[0], which is dereferenced by thread 0 on line 20.

```
1   long shared t[THREADS];
2   int shared * shared p[THREADS];
3   int shared u[THREADS];
4   void main( ) {
5       int i;
6       long shared * t2;
7       upc_forall(i=0;i<THREADS; i++; &t[i]){
8           t[i] = 1;
9           u[i] = 2;
10          p[i] = &u[i];
11      }
12      printf("Thread %d: &p[%d]=%p\n",
                MYTHREAD, MYTHREAD, &p[MYTHREAD]);
13      printf("Thread %d: p[%d]=%p\n",
                MYTHREAD, MYTHREAD, p[MYTHREAD]);
14      printf("Thread %d: *p[%d]=%d\n",
                MYTHREAD,MYTHREAD, *p[MYTHREAD]);
15      t2 = &t[MYTHREAD];
16      t2++;
17      printf("Thread %d: t2=%p\n",
                MYTHREAD, t2);
18      *t2 = 0;
19      printf("Thread %d: p[%d]=%p\n",
                MYTHREAD, MYTHREAD, p[MYTHREAD]);
20      printf("Thread %d: *p[%d]=%d\n",
                MYTHREAD,MYTHREAD,*p[MYTHREAD]);
21      printf("Thread %d completed OK\n",
                MYTHREAD);
22  }
```

EXAMPLE 2

For the purpose of the following explanation, it is assumed that the program of EXAMPLE 2 runs on two threads, thread 0 and thread 1. When thread 1 executes the statement at line 16, the index expression goes out of the bounds on t. Due to the way the shared variables are declared, it is possible that p is allocated in memory right after t—and so it is on the platform. Because the type pointed to by t2 has the same size as pointers do, all 64 bits of p[0] get set to 0. The output of the execution then looks as follows. The prun command allows specifying the number of threads at launch time (here, 2).

```
> prun -n 2 a.out
Thread 0: &p[0]=1400002f8
Thread 0: p[0]=140000300
Thread 0: *p[0]=2
Thread 0: t2=200001400002f0
Thread 0: p[0]=0
Thread 1: &p[1]=200001400002f8
Thread 1: p[1]=20000140000300
```

-continued

```
Thread 1: *p[1]=2
Thread 1: t2=1400002f8
Thread 1: p[1]=20000140000300
Thread 1: *p[1]=2
Thread 1 completed OK
prun: ./a.out (pid 829826) killed by signal 11 (SIGSEGV)
```

The addresses of p[0] and p[1] have the same low bits on their respective threads (i.e., their local addresses are equal). After the increment of t2 at line 16, the resulting global address is printed, and its value on thread 1 is checked to determine if it equals that of p[0] on thread 0. Therefore, the assignment at line 18 incorrectly sets p[0] to 0, which is witnessed by the last message printed by thread 0. In conclusion, thread 1 corrupts the portion of shared data that is local to thread 0. Thread 0 crashes, but thread 1 completes OK.

In this example, the bug manifests itself as the dereference of a null pointer. The larger problem, however, is the data race between the write on line 18 by thread 1 and the read of p[0] on line 20 by thread 0. The data race bug arises from manipulation of pointers related to t, but an unrelated data structure gets corrupted because there is no algorithmic connection between t and p.

Action of Code Generator 64 on Entry to a Protected Scope

In response to the protect pragma, the code generator 64 answers the following questions:

1. What is the size of the local array each thread will maintain to back up the elements of p it protects—so that the code to declare the local array can be generated on entry to the protection scope?

2. What code should be generated to initialize the back-up array after its declaration?

If the protected object is a scalar, an array element, or an entire array, the answers to these questions are straightforward. The remaining two forms of the pragma are described in the rest of this section. In the following description, it is assumed that the dimension of p is 1 and that N is the size of this dimension.

In a static environment N and THREADS are compile-time constants, whereas in a dynamic environment N is a multiple of THREADS. In either case, the ratio N/THREADS is a compile-time constant.

The problem of initializing the back-up variable is equivalent to compiling the following loop:

```
upc_forall(i=0; i<N; i++; expr){
    saved_p[k++] = p[i];
}
``` where k is a local temporary integer initialized to 0 and expr is either &t[i] or &p[i], depending on which form that is considered. If B denotes the block factor of either t or p, depending on which form that is considered, the initialization problem requires the generation of the declaration of saved_p and the compilation of the upc_forall into a sequential loop. In this regard, If B equals 1, the pragma makes the code generator 64 generate the following code:

```
    type saved_p[size];
    int k=0;
    for (i=MYTHREAD; i<N; i+=THREADS) {
        saved_p[k++] = p[i];
    }
``` where size=N/THREADS and type is the type of p.

If B is greater than 1, the pragma makes the code generator 64 generate code equivalent to the following:

```
    type saved_p[size];
    int k=0;
    for (j=MYTHREAD; j<N/B; j += THREADS){
        for (q=0; q<min(B,N-(j*B)); q++) {
            i = j*B + q;
            saved_p[k++] = p[i];
        }
    }
```

The thread MYTHREAD protects as many elements of p as the element count in this subset, which has the following upper bound:

B*ceiling(((N/B)—MYTHREAD)/THREADS)

The static size of the local back-up array is the maximum of that bound over all threads, and therefore:

size=$B$*ceiling($(N/B)$/THREADS)

Action of Code Generator 64 on a Reference to a Protected Object

On a reference to a protected object, the code generator 64 answers the following question:

Given an arbitrary element p[x], how does the code generator 64 know (a) if p[x] is protected in the current thread (and therefore decide if it has to generate protection code), and (b) what is the index of saved_p that backs up p[x]?

If the protected object is a scalar, an array element, or an entire array, the answer is straightforward. For the remaining two forms, answering (a) boils down to checking if p[x] (or t[x], in the other form of the pragma) has affinity with MYTHREAD. Answering (b), however, depends again on the block factor B of either p or t, depending on which form of the pragma is relevant:

If B=1, answering the question is equivalent to solving:

$\exists k \geq 0 s.t.$ MYTHREAD+$k$THREADS<$N$,

MYTHREAD+$k$THREADS=$x$

Given any reference p[x], the index k of the element of the local array that backs up p[x] is:

$k=(x-$MYTH READ$)$/THREADS

In some implementations, the code generator 64 checks that (a) k is a nonnegative integer and (b) MYTHREAD+k THREADS<N. In these implementations, code generator 64 may check both conditions statically, or it may generate code to that purpose. If both conditions hold, then p[x] is backed up by saved_p[k]. Otherwise, p[x] is not protected by MYTHREAD.

If B>1, the question is equivalent to solving:

$\exists j,k,q \in N$ s.t. $k \geq 0, j=$MYTHREAD+$k$ THREADS, $0 \leq q < B, x=Bj+q, x<N$ There is at most one pair (k,q) satisfying this equation. This pair may be computed at run-time by code implementing the following algorithm:

```
    If x >= N
    Then Return NO SOLUTION
    Else begin
        For q = 0 to B-1 do
            If x-q multiple of B
            Then
                Let j=(x-q)/B
                Let k=(j-MYTHREAD)/THREADS
                If k is integral
                Then
                    Return SOLUTION = (k,q)
                Endif
            Endif
        Endfor
        Return NO SOLUTION
    Endif
```

If there is a solution (k,q), then p[x] is backed up by saved_p[B k+q].

Action of Code Generator 64 on Exit from a Protected Scope

On exit from a protected scope, all protected elements are checked against their respective back-up variables, in any order. For the last two forms of the pragma, the corresponding code is equivalent to:

```
    k=0;
    upc_forall(i=0; i<N; i++; expr){
        if (saved_p[k++] != p[i])
            error( );
    }
``` where expr is either &t[i] or &p[i], depending on which form is considered.

Back to Example 2

To protect the elements of p in EXAMPLE 2, a programmer would insert statements 6b, 6c and 21b into the code of EXAMPLE 2, as shown below (some lines are omitted):

```
4      void main( ) {
5          int i;
6          long shared * t2;
6b         #pragma protect p[ ]
6c         {
7              upc_forall(i=0;i<THREADS;i++;&t[i]){
8                  t[i] = 1;
9                  u[i] = 2;
10                 p[i] = &u[i];
11             }
...
15         t2 = &t[MYTHREAD];
16         t2++;
17         printf("Thread %d: t2=%p\n",
                    MYTHREAD, t2);
```

-continued

```
18        *t2 = 0;
...
21b   }
```

In EXAMPLE 2:

N/THREADS=THREADS/THREADS=1 so a single element is (statically) allocated in saved_p. The preceding annotated source code is translated by code generator 64 into the following code:

```
6c   {
6d       int shared * saved_p[1];
6e       int k=0;
6f       for(i=MYTHREAD;
             i<THREADS; i+=THREADS)
6g           saved_p[k++]= p[i];
7    upc_forall(i=0;i<THREADS; i++; &t[i]){
7b       int shared * tmp;
8        t[i] = 1;
9        u[i] = 2;
9c       tmp = &u[i];
         //Subscript is strengh-reduced to 0:
9d       saved_p[(i-MYTHREAD)/THREADS]=tmp;
10       p[i] = tmp;
11   }
```

In addition, each reference to an element of p is preceded by code to check its protection. Statements at lines 13, 14, 19 and 20 contain such a reference and therefore are preceded by such code. For instance, line 19 is preceded by:

```
18b if (saved_p[0] != p[MYTHREAD]) {
18c     error( );
18d }
```

In EXAMPLE 2, line 19 is changed so that the saved value is used instead of p[MYTHREAD]:

19 printf("Thread % d: p[% d]=% p/n ",

MYTHREAD, MYTHREAD, saved_p[0]);

In some implementations, code generator 64 with use the following code instead of lines 6e through 6g:

6e saved_p[0]=p[MYTHREAD];

In some implementations, the subscript on line 9d, which calls for one iteration of i equals MYTHREAD of the upc_forall per thread, is statically strength-reduced to 0, which satisfies conditions (a) and (b) of the case B=1 in the section described above entitled "ACTION OF CODE GENERATOR 64 ON A REFERENCE TO A PROTECTED OBJECT".

The same rules may be applied to compute the subscript of saved_p on line 18b. The value of k is given by k=(MYTHREAD—MYTHREAD)/THREADS which equals 0. Thus, k is a nonnegative integer and, on all threads, MYTHREAD<N since N equals THREADS. Therefore, the back-up storage for p[MYTHREAD] is indeed saved_p[0].

Executing Machine-Executable Code Containing Embedded Data Race Detection Instructions The above-described machine-executable code 62, which is generated by code generator 64, may be executed in the context of a debugger program or other application program that is designed to assist a programmer by identifying the occurrences of data race conditions during execution of program code 60.

Figure 6:
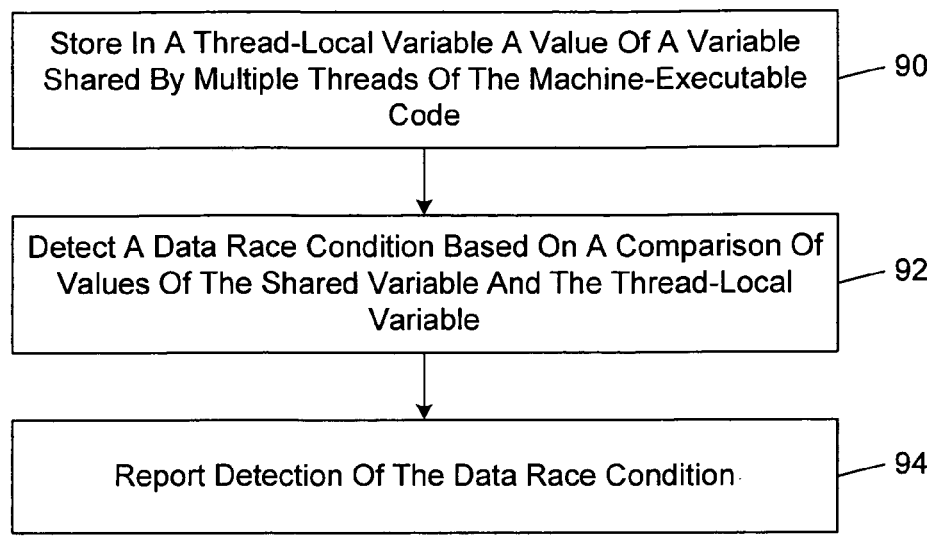
FIG. 6 is a flow diagram of an embodiment of a method of processing program code to detect data races occurring during execution of the program code.

FIG. 6 shows an embodiment of a method by which the data processing system 10 executes the machine-executable code 62. In this embodiment, the data processing system 10 stores in a thread-local variable a value of a variable shared by multiple threads of the machine-executable code 62 (block 90). This is achieved by executing, for example, the instruction "int saved_x=x" in EXAMPLE 1. The data processing system 10 detects a data race condition based on a comparison of values of the shared variable and the thread-local variable (block 92). This is achieved by executing, for example, the instructions "if(x!=saved_x), error( )" in EXAMPLE 1. The data processing system 10 reports detection of the data race condition (block 94). This is achieved by executing, for example, reporting instructions that are pointed to by the "error( )" branch in EXAMPLE 1.

Figure 7:
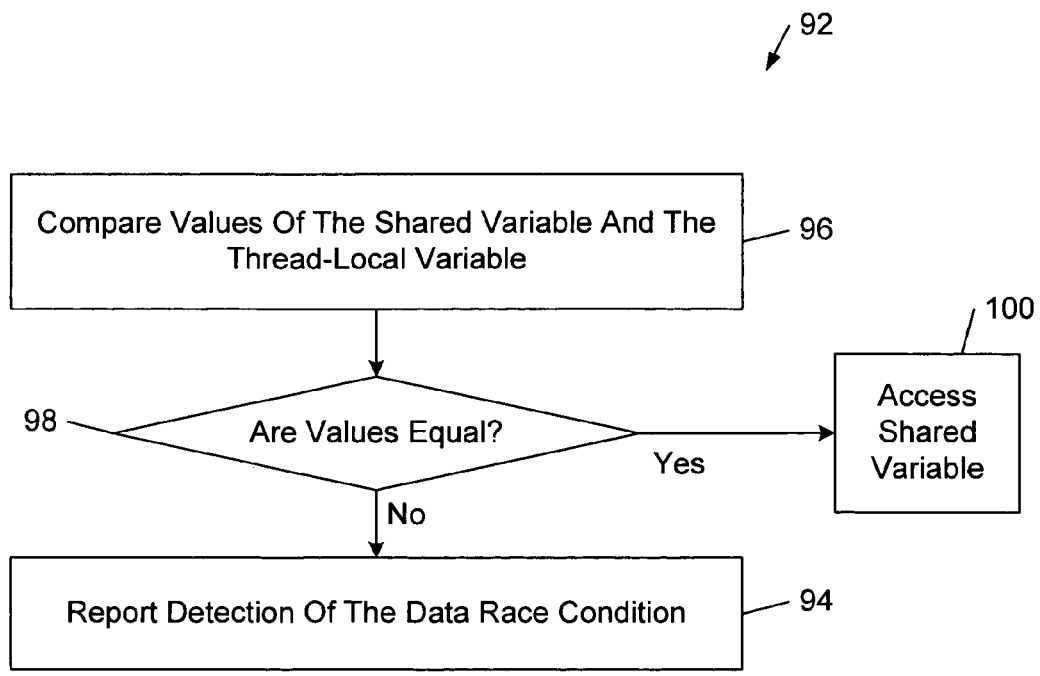
FIG. 7 is a flow diagram of an implementation of the program code processing block 92 shown in FIG. 6

FIG. 7 shows an implementation of block 92 in the embodiment of FIG. 6. In this implementation, the data processing system 10 compares the values of the shared variable and the thread-local variable (block 96). If the values are equal (block 98), the data processing system 10 accesses the shared variable (block 100). If the values are not equal (block 98), the data processing system 10 reports the detection of the data race condition (block 94). The comparing and branching operations of blocks 96 and 98 are performed in response to execution of the instructions "if(x!=saved_x), error( )" in EXAMPLE 1, for example.

Other embodiments are within the scope of the claims.

The systems and methods described herein are not limited to any particular hardware or software configuration, but rather they may be implemented in any computing or processing environment, including in digital electronic circuitry or in computer hardware, firmware, or software.

What is claimed is:

1. A machine-implemented method of processing program code, comprising:
    storing in a thread-local variable a value of a variable shared by multiple threads for executing the program code;
    detecting a data race condition based on a comparison of values of the shared variable and the thread-local variable; and
    reporting detection of the data race condition.

2. The method of claim 1, wherein the shared variable value is stored to the thread-local variable during execution of at least a given one of the threads sharing the shared variable.

3. The method of claim 2, wherein the data race condition is detected during execution of the given thread.

4. The method of claim 3, wherein the detection of the data race condition is reported during execution of the given thread.

5. The method of claim 1, further comprising comparing the values of the shared variable and the thread-local variable after the shared variable value is stored in the thread-local variable, and subsequently loading the shared variable value.

6. The method of claim 1, wherein the data race condition is detected based on a determination that the values of the shared variable and the thread-local variable are different.

7. The method of claim 1, wherein the reporting comprises reporting a detection of the data race condition in response to a determination that the values of the shared variable and the thread-local variable are different.

8. A machine-readable medium storing machine-readable instructions for causing a machine to:
  store in a thread-local variable a value of a variable shared by multiple threads for executing the program code;
  detect a data race condition based on a comparison of values of the shared variable and the thread-local variable; and
  report detection of the data race condition.

9. The machine-readable medium of claim 8, wherein the machine-readable instructions cause a machine to store the shared variable value to the thread-local variable during execution of at least a given one of the threads sharing the shared variable.

10. The machine-readable medium of claim 9, wherein the machine-readable instructions cause a machine to detect the data race condition during execution of the given thread.

11. The machine-readable medium of claim 10, wherein the machine-readable instructions cause a machine to report the detection of the data race condition during execution of the given thread.

12. The machine-readable medium of claim 8, wherein the machine-readable instructions cause a machine to compare the values of the shared variable and the thread-local variable after the shared variable value is stored in the thread-local variable, and to subsequently load the shared variable value.

13. The machine-readable medium of claim 8, wherein the machine-readable instructions cause a machine to detect the data race condition based on a determination that the values of the shared variable and the thread-local variable are different.

14. The machine-readable medium of claim 8, wherein the machine-readable instructions cause a machine to report a detection of the data race condition in response to a determination that the values of the shared variable and the thread-local variable are different.

15. A machine-implemented method of processing program code, comprising:
  generating a machine-readable instruction to store in a thread-local variable a value of a variable shared by multiple threads for executing the program code;
  generating a machine-readable instruction to detect a data race condition based on a comparison of values of the shared variable and the thread-local variable; and
  storing the machine-readable instructions in a machine-readable medium.

16. The method of claim 15, further comprising generating a machine-readable instruction to report detection of the data race condition.

17. The method of claim 15, further comprising identifying the shared variable.

18. The method of claim 15, further comprising identifying an access to the shared variable to test for occurrence of a data race condition.

19. The method of claim 15, further comprising determining whether an instruction in the program code stores a value to the shared variable.

20. The method of claim 19, wherein the machine-readable instruction to store the shared variable value to the thread-local variable is generated in response to a positive determination that the program code instruction stores a value to the shared variable.

21. The method of claim 19, wherein the machine-readable instruction to detect the data race condition is generated in response to a negative determination that the program code instruction stores a value to the shared variable.

22. A machine-readable medium storing machine-readable instructions for causing a machine to:
  generate a machine-readable instruction to store in a thread-local variable a value of a variable shared by multiple threads for executing the program code;
  generate a machine-readable instruction to detect a data race condition based on a comparison of values of the shared variable and the thread-local variable; and
  store the machine-readable instructions in a machine-readable medium.

23. The machine-readable medium of claim 22, wherein the machine-readable instructions cause a machine to generate a machine-readable instruction to report detection of the data race condition.

24. The machine-readable medium of claim 22, wherein the machine-readable instructions cause a machine to identify the shared variable.

25. The machine-readable medium of claim 22, wherein the machine-readable instructions cause a machine to identify an access to the shared variable to test for occurrence of a data race condition.

26. The machine-readable medium of claim 22, wherein the machine-readable instructions cause a machine to determine whether an instruction in the program code stores a value to the shared variable.

* * * * *

UNITED STATES PATENT AND TRADEMARK OFFICE
CERTIFICATE OF CORRECTION

PATENT NO. : 7,366,956 B2  Page 1 of 1
APPLICATION NO. : 10/870722
DATED : April 29, 2008
INVENTOR(S) : Alan H. Karp et al.

It is certified that error appears in the above-identified patent and that said Letters Patent is hereby corrected as shown below:

In column 11, line 43, delete "%p/n" and insert -- %p\n --, therefor.

Signed and Sealed this

Twenty-ninth Day of July, 2008

JON W. DUDAS
*Director of the United States Patent and Trademark Office*